(12) United States Patent
Mizutani et al.

(10) Patent No.: US 8,400,102 B2
(45) Date of Patent: Mar. 19, 2013

(54) ASSEMBLED BATTERY UNIT AND VEHICLE

(75) Inventors: Mami Mizutani, Hachioji (JP); Ryuichi Morikawa, Higashimurayama (JP); Masahiro Tohara, Fuchu (JP); Shinichiro Kosugi, Saku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 308 days.

(21) Appl. No.: 12/836,972

(22) Filed: Jul. 15, 2010

(65) Prior Publication Data

US 2011/0011653 A1 Jan. 20, 2011

(30) Foreign Application Priority Data

Jul. 17, 2009 (JP) .................... 2009-169256
Mar. 12, 2010 (JP) .................... 2010-056757

(51) Int. Cl.
*H02J 7/14* (2006.01)
*H02J 7/00* (2006.01)
(52) U.S. Cl. .............. 320/104; 320/116; 320/118
(58) Field of Classification Search .......... 320/104, 320/116, 118
See application file for complete search history.

(56) References Cited

U.S. PATENT DOCUMENTS

| 7,053,588 B2* | 5/2006 | Nakanishi et al. | 320/104 |
| 7,893,652 B2* | 2/2011 | Suzuki et al. | 320/104 |
| 2006/0103351 A1* | 5/2006 | Tanigawa et al. | 320/118 |
| 2006/0214636 A1* | 9/2006 | Arai et al. | 320/116 |
| 2009/0208822 A1 | 8/2009 | Morikawa et al. | |
| 2010/0019724 A1 | 1/2010 | Mizutani et al. | |
| 2011/0127958 A1* | 6/2011 | Ishishita et al. | 320/109 |

FOREIGN PATENT DOCUMENTS

| JP | 11-150877 | 6/1999 |
| JP | 2001-218376 | 8/2001 |
| JP | 2003-219572 | 7/2003 |

OTHER PUBLICATIONS

U.S. Appl. No. 12/716,586, filed Mar. 3, 2010, Ryuichi Morikawa, et al.

* cited by examiner

*Primary Examiner* — M'Baye Diao
(74) *Attorney, Agent, or Firm* — Oblon, Spivak, McClelland, Maier & Neustadt, L.L.P.

(57) ABSTRACT

According to one of the embodiment, an assembled battery has a plurality of cells electrically connected in series. A charge amount difference detection circuit detects charge amount difference of the cells. Wherein, while a charging or discharge current is being applied to the cells, the charge amount difference detection circuit detects charge amount differences greater than a charge amount of a reference cell having a minimum charge amount, the charge amount differences of the cells are determined by addition of the charging or discharge currents during a period corresponding to the time differences between the reference cell and the other cells reaching a predetermined specific voltage, discharge switches are controlled by a switch controller, based on the charging amount differences.

7 Claims, 7 Drawing Sheets

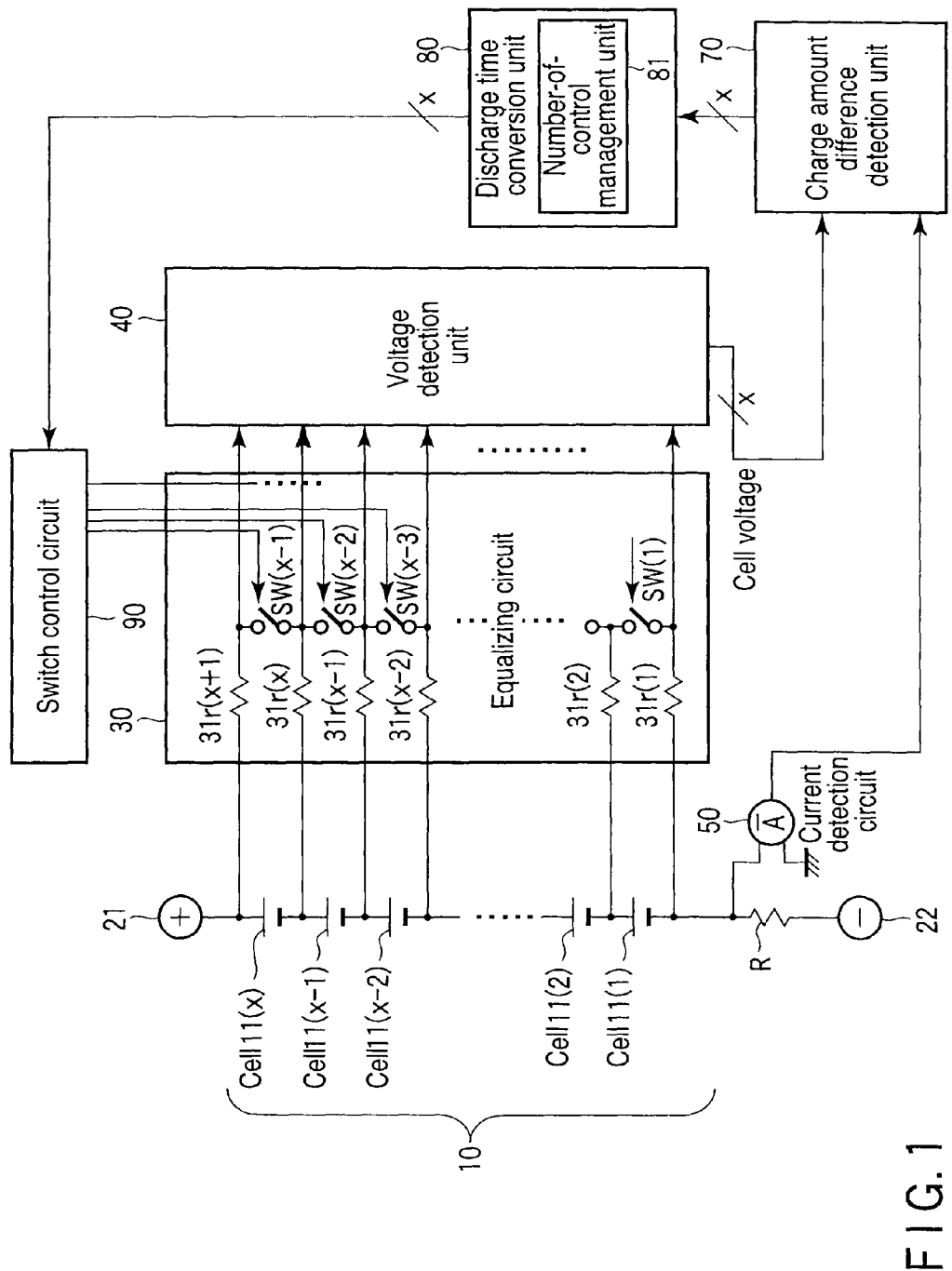
F I G. 1

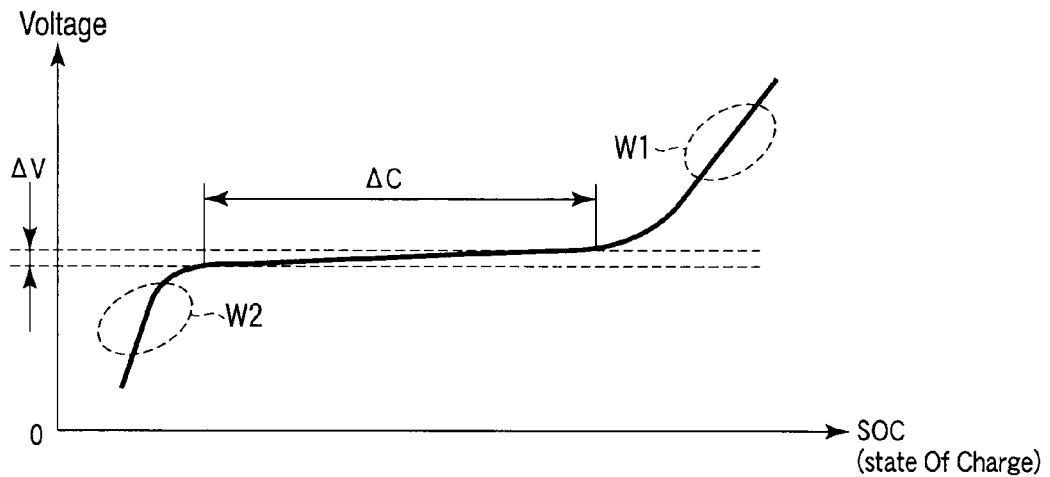
F I G. 2
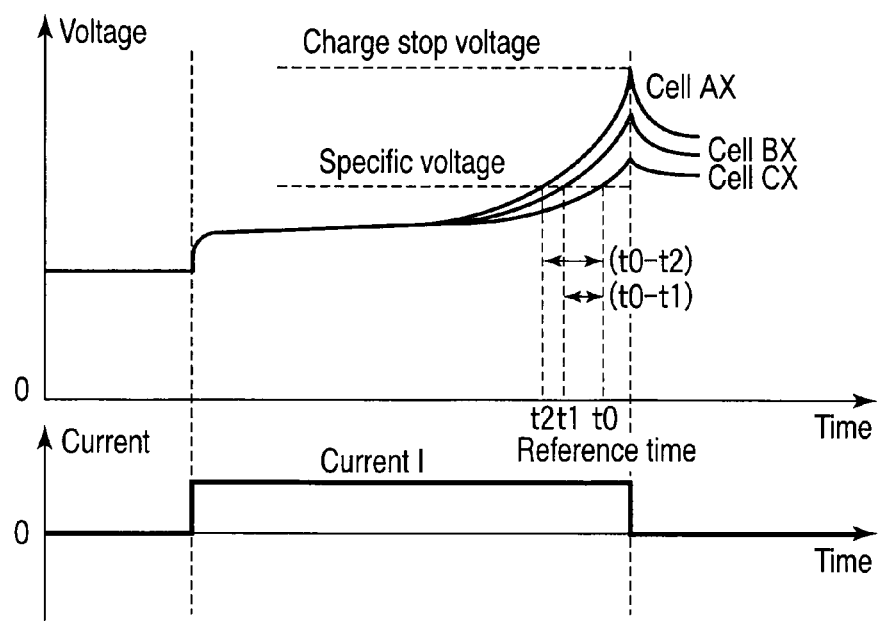
F I G. 3

$\Delta C(n)/Ib=$(discharge time)

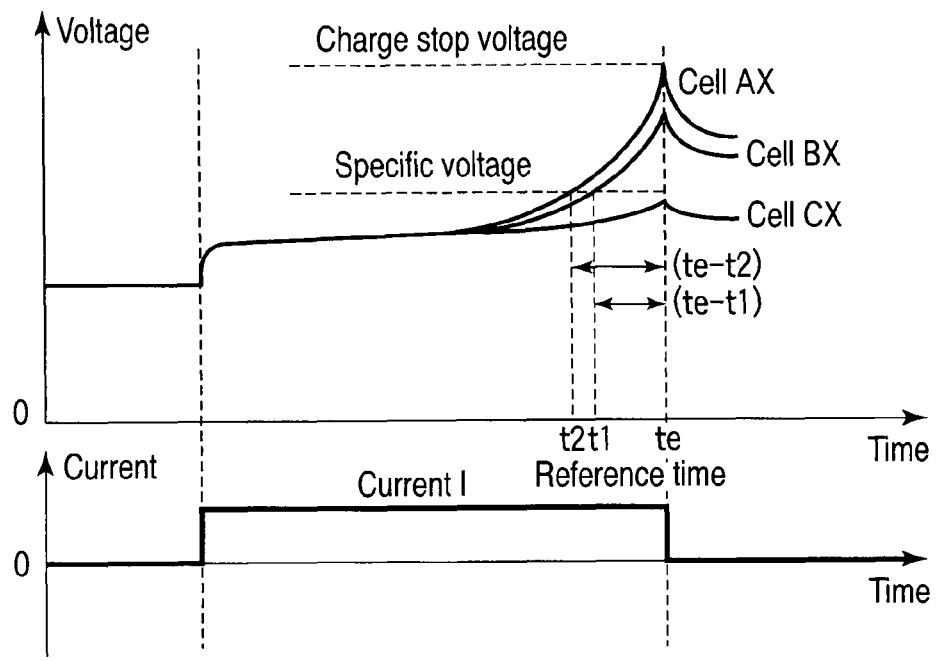
F I G. 6
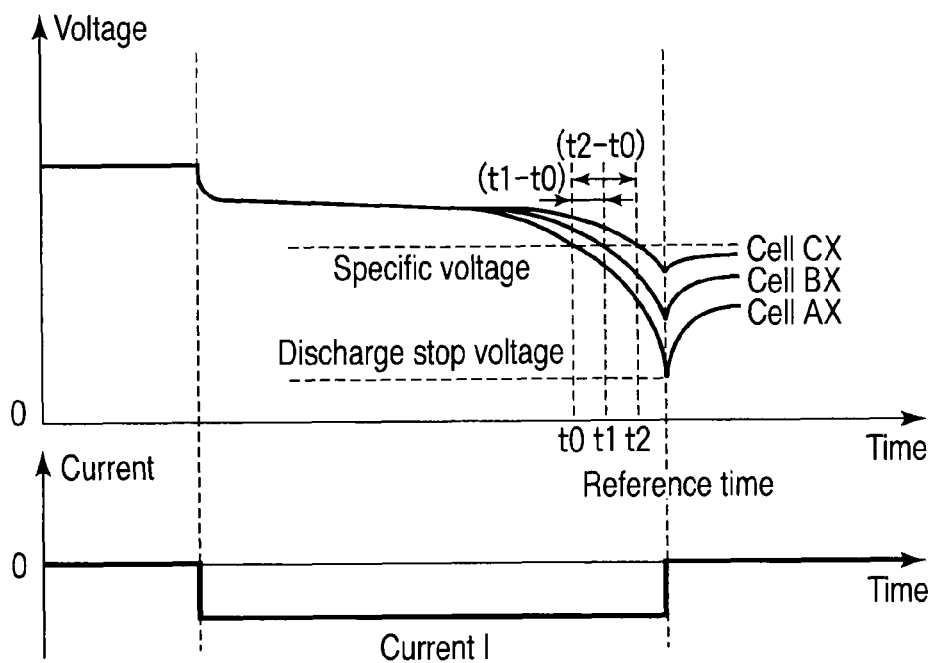
F I G. 7

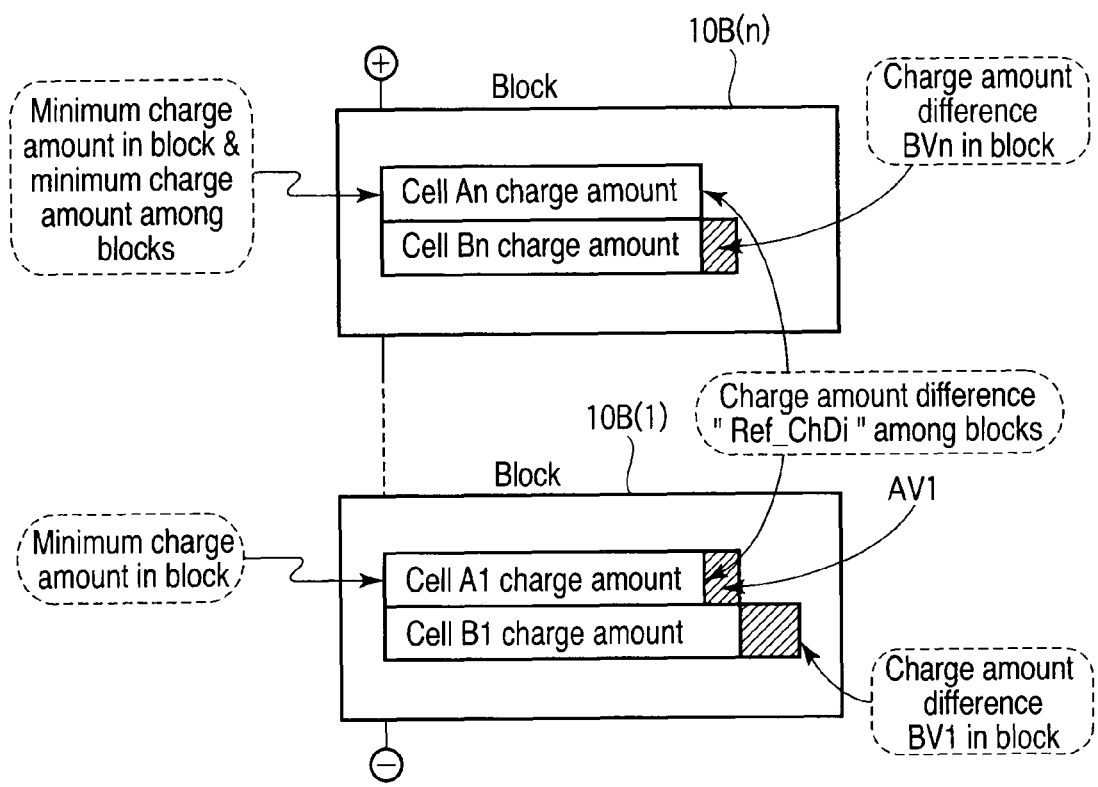
F I G. 9

ASSEMBLED BATTERY UNIT AND VEHICLE

CROSS-REFERENCE TO RELATED APPLICATIONS

This application is based upon and claims the benefit of priority from Japanese Patent Applications No. 2009-169256, filed Jul. 17, 2009; and No. 2010-056757, filed Mar. 12, 2010; the entire contents of both of which are incorporated herein by reference.

FIELD

Embodiments described herein relate generally to an assembled battery unit comprising a secondary battery, and a vehicle equipped with the assembled battery unit. In particular, the embodiment of the invention relates to adjustment of charge amount of unit cells constituting an assembled battery unit.

BACKGROUND

An output voltage of a unit cell is determined by a material system composing a cell. In a secondary battery assuming that a unit cell is not replaced, an assembled battery unit is proposed, in which a plurality of unit cells is electrically connected in series and inseparably assembled into one unit to obtain a high voltage.

Such an assembled battery unit may be used alone. A plurality of assembled battery units is combined in various forms, and widely used as a power supply for driving a motor in a forklift and an electric car, or as a part of power conditioner in a solar photovoltaic power generation system, for example.

In an assembled battery unit, it is well known that the states of connected unit cells are turned to be uneven, as a result of variations in charging/discharging or temperature changes of a secondary battery. It is assumed that when the amount of electric charge stored in unit cells is uneven, or when the state of charge (SOC: charge rate to charge capacity of a cell) is uneven, charging and discharging are controlled to prevent overcharge and over discharge of any cell in an assembled battery unit. Thus, an assembled battery unit is charged or discharged to meet a cell, which first reaches a charge or discharge limit, and does not reach ideal amount of charge.

Considering the above problem, generally, unit cells having similar capacity are selected and combined connected in a series-connected assembled battery.

In such an assembled battery unit, as a method of equalizing the charge amount of cells which are exhibit imbalance, a resistor discharging method is known (e.g., Jpn. Pat. Appln. KOKAI Publication No. 11-150877). As a method of determining a secondary battery to be discharged, a method of detecting a voltage difference between batteries and determining a discharge cell based on the voltage difference is known (e.g., Jpn. Pat. Appln. KOKAI Publication Nos. 2001-218376 and 2003-219572).

Jpn. Pat. Appln. KOKAI Publication No. 11-150877 discloses a method of detecting variations in voltage or capacity of a battery, and charging a high-energy battery through a resistor.

Jpn. Pat. Appln. KOKAI Publication No. 2001-218376 discloses a method of charging a unit cell settle variations in voltage difference within an allowable range. The method sets a minimum unit battery voltage, and discharges unit cells exceeding a threshold voltage.

Jpn. Pat. Appln. KOKAI Publication No. 2003-219572 discloses a method of detecting a difference in a state of charge (SOC), and discharging cells in the order of charge amount. The method determines the difference in SOC by the difference in battery voltage.

Both above methods assume that the SOC of each cell is adjusted to be even. Estimation of SOC depends on a close correlation between SOC and voltage of a cell, and includes a step of measuring absolute SOC and voltage of each cell.

A voltage is used to estimate SOC in the above estimation. Such estimation is effective to some extent in a system, in which a voltage is greatly changed as SOC is changed, but accuracy is not expected in a system, which includes an area where a voltage is not changed or changed a little, and satisfactory equalization is difficult.

Even if the characteristic of a cell is unlike the above, generally, an output voltage curve of a cell or a correlation curve between voltage and SOC is changed by environmental factors such as uneven temperatures in a module, and complete conversion to SOC is difficult merely by checking an output voltage of a cell. Therefore, in the conventional equalization process, SOC is not satisfactorily equalized even after being equalized.

BRIEF DESCRIPTION OF THE DRAWINGS

FIG. 1 is an exemplary block diagram of an embodiment of the invention;

FIG. 2 is a graph showing the relationship between voltage and charge rate (SOC) of a cell;

FIG. 3 is a graph showing the relationship between time and cell voltage changes in each unit cell when a secondary battery group is charged;

FIG. 6 is a graph showing another example of the relationship between time and cell voltage changes during charging;

FIG. 7 is a graph showing an example of the relationship between time and cell voltage changes during discharging;

FIG. 9 is a diagram explaining an operation example of the unit of FIG. 8; and

DETAILED DESCRIPTION

Figure 4:
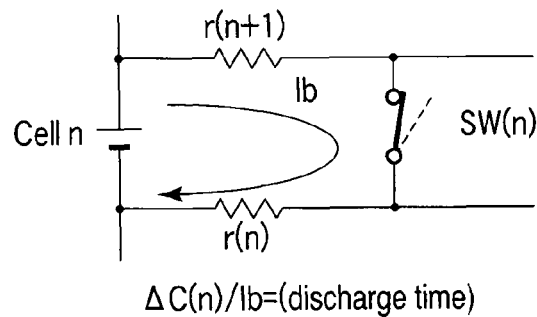
FIG. 4 is an exemplary circuit diagram explaining the operation of the embodiment unit discharges energy stored in a cell.

In general, according to one embodiment, the invention will be described hereinafter with reference to the accompanying drawings.

An embodiment of the present invention is to provide an assembled battery unit, which is applicable to a variety of cells and capable of adjusting a charge amount without increasing accuracy and resolution of a sensor, and a vehicle, which obtains a driving force from the assembled battery unit.

According to an embodiment, charge amounts of cells electrically connected in series are adjusted by discharging each cell by the amount different from a charge amount of a reference cell having a minimum charge amount. Charge amount differences between the reference cell and other cells are obtained by adding predetermined current applied to the cells based on time differences between the reference cell and the other cells reaching a predetermined voltage within a period of applying the current.

FIG. 1 shows a functional block diagram of an assembled battery unit according to an embodiment of the invention.

A secondary battery group 10 comprises x number of unit cells 11(1) to 11(x) (herein after simply called cells) electrically connected in series. A positive electrode of the secondary battery group 10 is connected to an external positive terminal 21 and a negative electrode of the secondary battery group 10 is connected to an external negative terminal 22, through a current detection resistor R.

An equalizing circuit 30 comprises discharge resistors 31r(1) to 31r(x+1) and discharge switches SW(1) to SW(x+1) mounted on one circuit board.

Negative electrodes and positive electrodes of cells 11(1) to 11(x) are connected to a voltage detection unit 40 through the discharge resistors 31r(1) to 31r(x+1). One discharge resistor is shared by the series-connected adjacent cells. In other words, the number of discharge resistors is not double the number of cells, and one more than the number of cells.

One ends of the discharge resistors 31r(1) and 31r(2) are electrically connected to the cell 11(1), and the other ends are connected to the discharge switch SW(1).

Similarly, one ends of the discharge resistors 31r(n) and 31r(n+1) are electrically connected to the cell 11(n), and the other ends are connected to the discharge switch SW(n). In other words, ends of two parallel adjacent discharge resistors are electrically connected by a unit cell, and the other ends are connected by a discharge switch.

It is sufficient that the discharge switch SW(n) has a current capacity durable to a discharge current defined by a discharge resistor and cell voltage, and has a function of opening/closing electrical connection. A suitable structure of the discharge switch SW(n) is selectable. The switch may be configured to physically open and close a contact, or electrically open and close a contact by combining transistors.

The voltage detection unit 40 measures a voltage of each cell at a predetermined time. At a predetermined time, each cell is charged by connecting parallel to a flying capacitor provided for each cell, and each flying capacitor is electrically disconnected from each cell. Then, the voltage detection unit 40 sequentially measures the voltage of the flying capacitor. After the measurement, the flying capacitors are connected to ground potential, and discharged to prepare for next measurement.

A current detection circuit 50 is electrically connected parallel to a current detection resistor R connected in series to a negative electrode of the secondary battery group 10. A resistor having a very high resistance selected to prevent branching of a current is grounded through a capacitor having a predetermined capacitance. This capacitor is charged by the amount equivalent to a voltage drop caused by the current detection resistor R. Therefore, by measuring a potential difference at both electrodes of the capacitor, a current value flowing into the current detection resistor R can be known. This current value is obtained and digitized at every predetermined time, and continuously transmitted.

As the secondary battery group 10 comprises series-connected cells, a current in each cell is the same as a current in the current detection circuit 50.

A charge amount difference detection unit 70 detects a charge amount difference between the cells 11(n) constituting the secondary battery group 10, from the values of voltage and current received from the voltage detection unit 40 and current detection circuit 50, respectively.

The charge amount difference detection unit 70 compares a measured voltage of each cell 11(n) received from the voltage detector 40 at every predetermined interval, with a predetermined specific voltage. As a result of the comparing, when any one of the cells 11(n) shows the same or higher voltage value than the specific voltage, addition of the current values of that cell is started and continued thereafter. The added current values are emitted from the current detection circuit 50 at every predetermined interval. The addition is continued up to a predetermined timing. In other words, the addition is continued until any one of the cells reaches a predetermined charge stop voltage or a discharge stop voltage, or until all cells reach a predetermined specific voltage. The total current value at the end of the addition is assumed to be an index to indicate the charge amount of each cell.

The charge amount difference detection unit 70 calculates a charge amount difference of each cell by using a total current value of each cell added up to that time, when any one of the cells reaches a charge stop voltage or a discharge stop voltage, or when all cells reach a predetermined specific voltage.

When detecting a charge amount difference in charge mode, the charge amount difference detection unit 70 calculates a charge amount difference for a cell which last reaches a specific voltage, from the specific voltage values of the other cells in an assembled battery. In other words, charge amount differences $\Delta C(n)$ of each of the cells 11(n) are calculated by subtracting the total current value of the cell which reaches a specific voltage last, from the total current values of each of the cells, respectively.

Therefore, a charge amount difference $\Delta C$ in a reference cell is always zero by definition.

A discharge time conversion unit 80 receives charge amount differences for each cell obtained by the charge amount difference detection unit 70, performs predetermined operation, and calculates the length of time to close each discharge switch related to equalization of each cell. This length of time is input to a switch control circuit 90, and used to control opening and closing of the discharge switch.

A discharge time conversion unit 80 calculates a discharge amount of a high-energy cell, and converts a discharge amount into a charging time or a control amount, to eliminate the difference in charge amount difference between the cells in the same assembled battery unit.

A switch control circuit 90 is connected to the discharge switches SW(1) to SW(x+1), and controls opening and closing of the discharge switches. The discharge time information of each cell calculated by the discharge time conversion unit 80 is input to the switch control circuit 90. A discharge switch corresponding to a cell to be discharged is turned on for the length of time based on the input discharge time information, and the cell is discharged, or the electrical charge of the cell is discharged.

According to the above configuration, the cells are equalized by adjusting the charge amount of a large-capacity cell to that of a lowest-capacity cell.

FIG. 2 is graph showing the relationship between the voltage and state of charge (SOC) of a cell.

The unit of this embodiment depends on a voltage deviation between cells, when making equalization. Because, as shown in FIG. 2, a voltage difference $\Delta V$ is very small even if a large difference $\Delta C$ is present in state of charge (SOC) in some types of battery, and a detection tolerance may become very small.

In a cell having the characteristics shown in FIG. 2, a voltage is measured in an area W1 (enclosed by a dotted line) close to a charge stop voltage, or an area W2 (enclosed by a dotted line) close to a discharge stop voltage, where the correlation is relatively large.

In an ordinary cell, a voltage is flatly increased according to a state of charge (SOC) being increased. Even in the case of applying to a system having a some section where a voltage is not flatly increased, it is disable to select a section showing a flat change of the voltage, for similar operations with above mentioned.

This embodiment realizes a system configured to set a measuring point in an area, where a voltage difference is easy to measure, within a predetermined limited SOC area. In this case, equalization is possible without estimating an individual SOC.

FIG. 3 is a graph showing cell voltage changes in each unit cell when a charging current I is applied to a secondary battery group comprising three cells connected in series.

In the example of charging in FIG. 3, the cells AX, BX and CX sequentially reach a predetermined specific voltage with a time lag, when the series-connected secondary battery group is charged by a constant current, and a voltage changes in each cell, and the constant-current charging is stopped when the cell $A_X$ reaches a charge stop voltage.

The "specific voltage" means a constant, which indicates a voltage selected from optional voltages, which can be passed before a cell reaches a charge stop voltage. A specific voltage can be optionally selected, and preferably selected from a section where a voltage change to charge amount is relatively high, considering higher measurement accuracy.

A "charge stop voltage" means a constant, which indicates a voltage indicating full charge before a cell is overcharged. A charge stop voltage is optionally set according to the specifications of a product provided with the assembled battery unit and cells.

In FIG. 3, the cell AX first reaches a specific voltage. The reach time is t2. The cells BX and CX sequentially reach a specific voltage at the time t1 and t0.

Reference time in this model is set to the time t0, that is, the time from the charging start time to the time required by a cell which last reaches a specific voltage. A cell which requires the reference time is assumed to be a reference cell.

"Reference time" means the time required by any one of the cells 11(1) to 11(x) which reaches a specific voltage last, counted from a predetermined measurement start time. The time required by the other cells to reach a specific voltage is obtained by measuring the time elapsed from the same measurement start time.

"Predetermined measurement start time" is set to the time before appearance of a cell which first reaches a specific voltage.

The measurement start time can be counted from any time. It is preferable to set the measurement start time while a current condition is stable, to increase the accuracy in adding current values, and stabilize data. In other words, it is preferable to set the measurement start time to the time to start charging or discharging, or at any time between charging and discharging.

In the embodiment, a time difference between cells to reach a predetermined specific voltage is an index to indicate a charge amount difference.

In the example shown in FIG. 3, the cell charged minimum at the measurement start time requires the reference time to reach a specific voltage. This cell is assumed to be a reference cell. If the other cells can be discharged by the excessive amount compared with the reference cell, the cells can be equalized without checking the charge rate (SOC) of each cell.

The SOC differences between the cells AX and CX, and between BX and CX are determined by the differences in the time to reach a specific voltage. Since a cell which reaches a specific voltage fastest has the highest SOC in the charging process, the cell AX has the highest SOC in this example, and is followed by the cells BX and CX.

In other words, the SOC difference is directly related to (t0-t1) between the cells BX and CX, and (t0-t2) between the cells AX and CX. Therefore, if the cell current in this period are known, the charge amount differences $\Delta C(1)$ and $\Delta C(2)$ between the cells AX and CX, and between the cells BX and CX, respectively can be calculated. Namely, the charge amount in each cell, which is sufficiently compared with a reference cell, can be known.

In the example shown in FIG. 3, the charge amount difference $\Delta C(n)$ can be calculated by the following equation.

$$\Delta C(1) mAh = \int_{t0}^{t2} I dt \qquad \text{(Equation 1)}$$
$$\Delta C(2) mAh = \int_{t0}^{t1} I dt$$

The charge amount difference detection unit 70 executes this calculation by software and sequencer.

The charge amount difference detection unit 70 compares a predetermined specific voltage with the voltage values of all cells obtained and sent by the voltage detection unit 40. As a result of the comparison, when the voltage of any one of the cells equals or exceeds a predetermined specific voltage, the charge amount difference detection unit 70 starts addition of the current values of the cell, and the addition is continued up to a predetermined stop timing.

In the example shown in FIG. 3, as the cell AX reaches a specific voltage at the time t2, the current value I(t2) at the time t2 is input to a predetermined array (or alignment) corresponding to the cell AX, as an initial value for the addition.

Thereafter, assuming the sampling time of the current detection circuit 50 to be ts, a current value (t2+ts·n) (n: integer) is continuously added to the same array.

The addition is continued until a predetermined end timing. The addition is continued up to at least the reference time t0 in the example shown in FIG. 3. The addition may be continued up to the time to reach the charge stop voltage depending on the states of other systems. The addition is simultaneously stopped for all cells.

A current value added to each cell array is the same value at the same time. Only the timing to start the addition is different.

After the addition is finished, the total current value of a cell (reference cell) which reaches a specific voltage last is subtracted from the total current value of each cell, and a charge amount difference $\Delta C(n)$ from each cell 11(n) is calculated.

The discharge time conversion unit 80 receives the charge amount difference $\Delta C(n)$ between the reference cell and every each cell 11(n) calculated by the charge amount difference detection unit 70, and calculates a control amount corresponding to a discharge time or a charging time of each cell.

FIG. 4 shows an example of a discharge circuit of one cell. When the switch SW(n) is turned on, the cell n is shorted through discharge resistors r(n+1) and r(n). A discharge current Ib flows in each discharge resistor, and the energy in a cell is converted into Joule heat, and consumed. At this time, a discharge time required to consume the energy equivalent to the discharge amount difference $\Delta C(n)$ corresponds to $\Delta C(n)/$Ib.

The discharge current Ib is determined by the voltage of a cell n and the value of a discharge resistor r. As discharging advances, the voltage of the cell n fluctuates and is not constant, and the cell is not completely and ideally realized. However, this phenomenon usually occurs when a resistor discharging method is used in a battery, and is practically no problem. The degree of equalization is increased each time the equalization is repeated.

The discharge time required to equalize the states of charging can be reduced by decreasing the resistance value of a discharge resistor and increasing the amount of current. However, if the amount of current is great, a heating value is increased, then another problem is caused, and it is not preferable as a system. Therefore, a discharge resistor with a relatively high resistance value is selected, and the resistance value is determined by trading off the time that can be used for equalization.

In the assembled battery unit of this embodiment, a voltage value of each cell constituting a secondary battery group is obtained at every predetermined time and used for various controls. The voltage is monitored even during discharging. However, the voltage detection unit 40 and discharge switch SW($n$) are exclusive to each other, and alternately operated for predetermined time.

Therefore, the discharge time of a cell 11($n$) in this embodiment corresponds to the number of times to turn on (close) the discharge switch SW($n$) of a corresponding cell n. This number of times determines the amount of control in this embodiment. Time to hold the discharge switch SW($n$) on is predetermined, and the discharge switch is turned off (opened) after the predetermined time elapses.

In this embodiment, a number-of-control management unit 81 is further provided in the discharge time conversion unit 80 to convert the discharge time of a cell 11($n$) into the number of turning on the discharge switch SW($n$).

Figure 5:
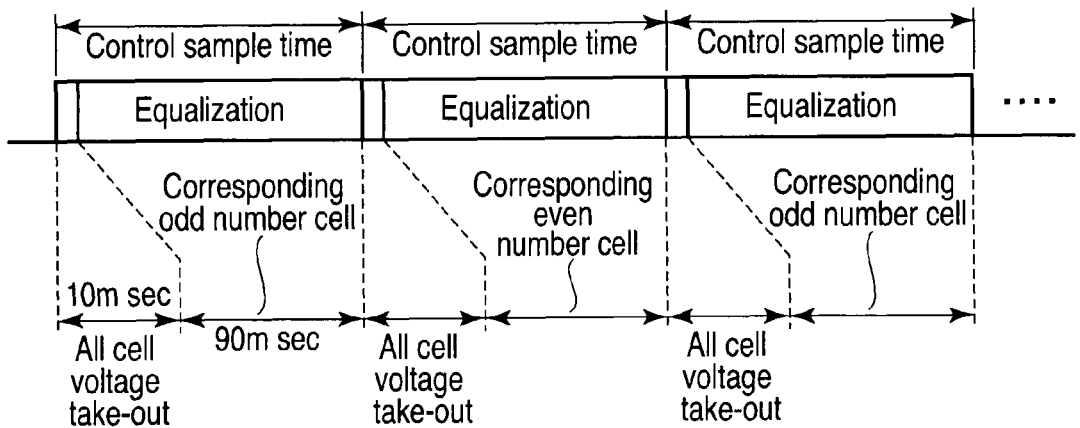
FIG. 5 is a perspective view explaining an example of cooperative operations with other functions, while the embodiment unit is being equalized.

FIG. 5 is a perspective view showing the relationship between voltage monitoring and discharge switch control in this embodiment.

In the example shown in FIG. 5, when x number of cells constituting the secondary battery group 10 are numbered sequentially from the electrically connected negative terminal side, the cells are divided into an odd number group and an even number group, and discharging is controlled for each group. Because, when a discharge switch is simultaneously turned on for adjacent cells, a discharge circuit is changed depending on the discharge number, and it is difficult to uniquely define the configuration of a discharge circuit. This can prevent complex calculation of the discharge time.

In FIG. 5, the control sample time for one unit is the sum of a period to take out the voltages of all cells by the voltage detection unit 40 and a period to turn on a discharge resistor. A discharge resistor is always turned off except the turning-on period, and is held off even during the turning-on period, if it is not to be control.

In adjacent control sample time, while the discharge resistor is being turned on, the controlled cells in the odd number group and even number group are alternately discharged.

It takes about 10 ms to take out voltage. If a voltage is taken out at every 100 ms, one discharge takes 90 ms. It is necessary to take a 120 ms interval to continue discharging of the same cell.

The number-of-control management unit 81 sets the time to discharge each cell to 90 ms, obtains the number of times to turn on the discharge switch corresponding to each cell, and sends the number of times to the switch control circuit 90.

The switch control circuit 90 and voltage detection unit 40 operate cooperatively and asynchronously to prevent a conflict. In predetermined control sample time, the switch control circuit turns a discharge switch corresponding to a predetermined cell until reaching the predetermined number of times for a predetermined cell obtained by the number-of-control management unit 81, by using the time except the voltage takeout period.

By the above operations, the assembled battery unit of this embodiment discharges and adjusts the charge amounts of cells constituting a secondary battery group to the same level. As the adjustment advances, the states of cells are substantially equalized.

FIG. 6 is a graph showing another example of charging a secondary battery group.

FIG. 6 shows an example, in which the cell CX does not reach a predetermined specific voltage before the charging current I is interrupted by the cell AX reaching a charge stop voltage.

Depending on the charge state of each cell constituting a secondary battery group, only one cell reaches a specific voltage at the time tx, and even if the cell reaches a charge stop voltage, all the other cells may not reach a specific voltage.

If all cells are equalized in the above state, a low charge cell may be over-discharged. Therefore, if any one cell does not reach a specific voltage, a charge stop voltage reach time te of a predetermined cell is considered as a reference time, and only a cell which reaches a specific voltage is equalized.

Assuming a specific voltage reach time of each cell n reaching a specific voltage to be tn, a charge amount difference between the cells is detected based on (te-tn).

In other words, the charge amount difference detection unit 70 usually adds current values, but if a current value of any one cell is not added, a charge amount difference from a cell not reaching a specific voltage is not output. It is preferable to inform the discharge time conversion unit 80 of predetermined information indicating that the addition is not positively performed.

When the charge amount difference detection unit 70 issues a value indicating that a charge amount difference is not detected, the discharge time conversion unit 80 sets a discharge time to zero for a cell for which a charge amount difference is not calculated. By branching conditions as above when calculating a charge amount difference, cells can be safely equalized without changing other circuits and logics.

In the above description, the information about discharging a cell for equalization is detected in a charge mode. However, cell discharge information for equalization may be obtained in a discharge mode. In other words, a discharge stop voltage is set to a voltage value lower than a specific voltage, and discharging is started after all cells are charged to a voltage higher than a specific voltage. In this case, a charge stop voltage is read as a discharge stop voltage, and the same operation is performed. A reference cell reaches a specific voltage fastest, and a specific voltage reach time of the cell is considered as a reference time.

Further, in the above description, the characteristic of the area W1 shown in FIG. 2 is used as SOC characteristic of a cell. However, as a necessary charge time is omitted when a charge amount is small, the characteristic of the area W2 in FIG. 2 may be used.

Next, an embodiment, which uses a discharge mode in an area where a charge amount is low, will be explained in detail.

FIG. 7 is a graph showing a voltage change in each cell when discharging is stopped at the time when a secondary battery group comprising series-connected cells AX, BX and CX is discharged by the current I, and any one of the cells reach a discharge stop voltage.

The example in FIG. 7 shows that the cells AX, BX and CX sequentially reach a predetermined specific voltage with a time lag, when a constant current discharge is made for the series-connected secondary battery group, and a voltage of each cell is changed, when the constant current discharge is stopped at the time when the cell AX reaches a discharge stop voltage.

Here, "discharge stop voltage" means a voltage value set by a designer not to overdischarge a cell.

"Specific voltage" is a voltage selected from the voltages allowable before a cell reaches a discharge stop voltage. A specific voltage can be optionally selected. From the viewpoint of increasing measurement accuracy, it is preferable to select a specific voltage within a range in which a voltage change to a charge amount is relatively large.

In the example shown in FIG. 7, as the cell AX reaches a specific voltage at the time t0, the current value I(t0) at the time t0 is input to the array of the cell AX as an initial value of addition. Thereafter, assuming the sampling time of the current detection circuit 50 to be ts, the current value I(t0+ts·n) (n: integer) at every sampling time is continuously added to the same array.

The addition is continued until predetermined stop timing. In the example shown in FIG. 7, the addition is continued until at least the specific voltage reach time t2 of the cell CX which reaches a specific voltage latest. The addition may be continued up to the time reaching a discharge stop voltage, depending on the conditions of other systems. The addition is stopped at the same time for all cells.

After the addition is stopped, the total current value of each cell is subtracted from the total current value of a cell which reaches a specific voltage first, and a charge amount difference $\Delta C(n)$ between the cells $11(n)$ is calculated.

In other words, a reference cell in a discharge mode is a cell which reaches a specific voltage first.

In FIG. 7, the cell AX reaches a specific voltage first. The reach time is set to t0. As the cells BX and CX sequentially reach a specific voltage, each reach time is set to t1 and t2.

A reference time in this model is set to the time t0 required by the cell reaching a specific voltage first to start discharging till reaching a specific voltage.

In the example shown in FIG. 7, a reference cell is a cell whose charge amount is the minimum. When using a discharge stop voltage, a cell reaching a specific voltage first is used as a reference cell. The other discussions about a reference cell are the same as those when using discharging.

SOC differences between cells AX and CX, and cells AX and BX are determined by the difference in the time to reach a specific voltage. A cell reaching a specific voltage fastest in a charging process is considered to be a cell having a highest current SOC. In this example, SOC is increased in the order of cells CX, BX and AX.

In other words, the degree of SOC difference is directly correlative, (t0-t1) between the cells AX and BX, and (t0-t2) between the cells AX and CX. Therefore, a charge amount difference between cells can be detected by knowing the states of cell current in these periods.

The charge amount difference detection unit 70 compares the voltage values of all cells obtained and transmitted from the voltage detection unit 40, with a predetermined specific voltage. As a result of the comparison, when a voltage of a certain cell $11(n)$ is the same or higher than a predetermined specific voltage, addition of the current values of the cell $11(n)$ is started, and the addition is continued up to a predetermined stop timing.

In the example shown in FIG. 7, the cell AX reaches a specific voltage at the time t0, the current value I(t0) at the time t0 is input to an alignment as an initial value of addition. Thereafter, assuming the sampling time of the current detection circuit 50 to be ts, the current value I(t0+ts·n) (n: integer) at every sampling time is continuously added to the same alignment.

The addition is continued up to predetermined stop timing. In the example shown in FIG. 7, the addition is continued at least to the specific voltage reach time t2 of the cell which reaches a specific voltage latest. The addition may be continued up to the time to reach a discharge stop voltage according to the conditions of other systems. The addition is stopped at the same time for all cells.

A current value added to alignment for each cell is the same value at the same time. Only the timing to start addition is different.

In the detection of a charge amount difference in the discharge mode, after the addition is finished, the total current value of a cell (reference cell) which reaches a specific voltage latest is subtracted from the total current value of each cell $11(n)$, and a charge amount difference $\Delta C(n)$ between the cells $11(n)$ is calculated.

Once a charge amount difference between cells is specified, subsequent steps can be executed by the entirely same logic as equalization performed in a charge mode.

The invention is not limited to the above embodiments. The invention may be realized by combining the embodiments. The invention may be realized as a unit configured to measure a charge amount difference between cells in either charge mode or discharge mode.

Figure 8:
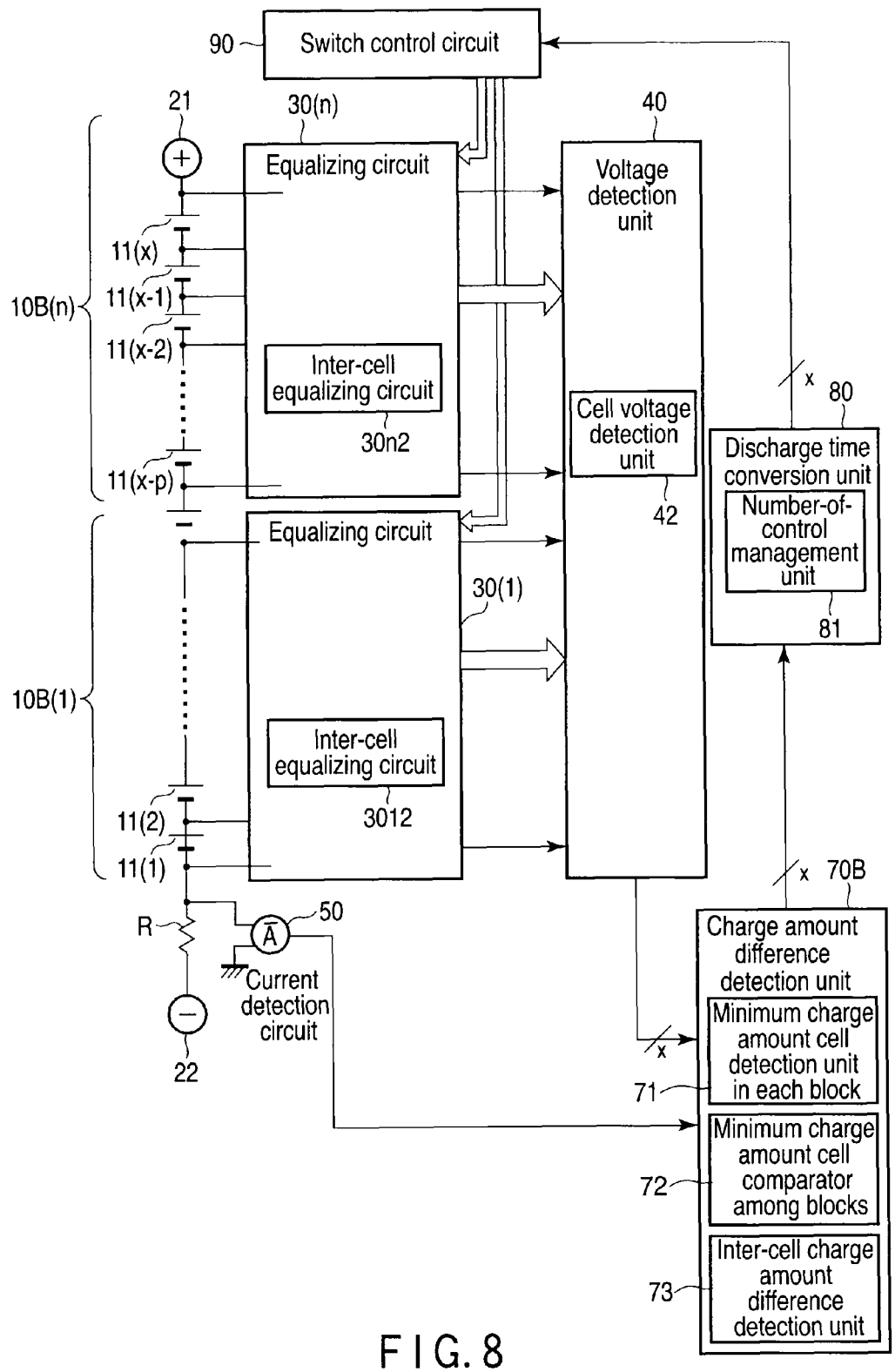
FIG. 8 is a perspective view of another embodiment of the unit of the invention.

FIG. 8 shows another embodiment of the unit of the invention. In this embodiment, cells $11(1)$ to $11(x)$ are grouped into blocks $10B(1)$ to $10B(n)$ comprising a predetermined number of cells, as modules. Equalizing circuits $30(1)$ to $30(n)$ are provided for the blocks (modules) $10B(1)$ to $10B(n)$. The equalizing circuits $30(1)$ to $30(n)$ include cell equalizing circuits $3012$ and $30n2$ including discharge switches $SW(1)$ to $SW(x+1)$ as described in the foregoing embodiments, when the unit blocks are assumed to be unit cells. The voltage detection unit 40 includes a cell voltage detection unit 42 to detect a terminal voltage of each cell as in the foregoing embodiments.

An example of an operation of the embodiment is disclosed as follows. It is assumed that two blocks $10B(1)$ and $10B(n)$ are connected in series to easy understand.

Now assume, the block $10B(1)$ includes, for example, cell $11(1)$ to cell $11(p)$, and the block $10B(n)$ includes, for example, cell $11(x-1)$ to cell $11(x)$.

In this embodiment, the charge amount difference detection unit 70B includes a minimum charge amount cell detection unit 71, a minimum charge amount cell comparator among blocks 72 and an inter-cell charge amount difference detection unit 73. The values of voltage and current received from the cell voltage detection unit 42 and current detection circuit 50 are inputted to the charge amount difference detection unit 70B.

The minimum charge amount cell detection unit 71 detects a minimum charge amount cell (so called reference cell) in the block $10B(1)$. The inter-cell charge amount difference detection unit 73 detects charge amount differences for each of the cells(1) to (p) in the block $10B(1)$. In this case, the method for obtaining the information on each cell in the blocks $10B(1)$ is the same as the method that described in the forgoing embodiment referring to FIGS. 1 to 3.

That is, the charge amount difference detection unit 73 compares a measured voltage of each of the cells $11(1)$-$11(p)$ received from the voltage detector 42 at every predetermined interval, with the predetermined specific voltage. As a result of the comparing, when any one of the cells shows the same or higher voltage value than the specific voltage, addition of the current values of that cell is started and continued thereafter. The added current values are emitted from the current detection circuit 50 at every predetermined interval. The addition is continued up to a predetermined timing. In other words, the addition is continued until any one of the cells 11(1)-11(p) reaches a predetermined charge stop voltage or a discharge stop voltage, or until all cells reach a predetermined specific voltage. The total current value at the end of the addition is assumed to be an index to indicate the charge amount of each of the cells 11(1)-11(p).

The charge amount difference detection unit 73 calculates a charge amount difference of each cell by using a total current value of each cell added up to that time, when any one of the cells reaches a charge stop voltage or a discharge stop voltage, or when all cells reach a predetermined specific voltage.

On the other hand, the minimum charge amount cell detection unit 71 detects a reference cell in the block 10B(1) during charge amounts of each of cells 11(1)-11(p) are measured, the reference cell is a cell that a charge amount reached first in the charging operation (refer to FIG. 3), or a charge amount reached last in the discharging operation (refer to FIG. 7). The minimum charge amount cell detection unit 71 temporarily stores the charge amount of the reference cell.

Therefore, the charge amount difference detection unit 73 calculates the differences between the charge amount of the reference cell and charge amounts of each of the cells 11(1)-11(p), and obtains the charge amount differences of each of the cells 11(1)-11(p).

Next, as the same as disclosed above, inter-cell charge amount difference detection unit 73 detects charge amount differences for each of the cells 11(x-p)-11(c) in the block 10B(n). The method for obtaining the information on each cell in the blocks 10B(n) is the same as the method that described in the forgoing embodiment referring to FIGS. 1 to 3.

That is, the charge amount difference detection unit 73 compares a measured voltage of each of the cells 11(x-p)-11(x) received from the voltage detector 42 at every predetermined interval, with the predetermined specific voltage. As a result of the comparing, when any one of the cells shows the same or higher voltage value than the specific voltage, addition of the current values of that cell is started and continued thereafter. The added current values are emitted from the current detection circuit 50 at every predetermined interval. The addition is continued up to a predetermined timing. In other words, the addition is continued until any one of the cells 11(x-p)-11(x) reaches a predetermined charge stop voltage or a discharge stop voltage, or until all cells reach a predetermined specific voltage. The total current value at the end of the addition is assumed to be an index to indicate the charge amount of each of the cells 11(x-p)-11(x).

The charge amount difference detection unit 73 calculates a charge amount difference of each cell by using a total current value of each cell added up to that time, when any one of the cells reaches a charge stop voltage or a discharge stop voltage, or when all cells reach a predetermined specific voltage.

On the other hand, the minimum charge amount cell detection unit 71 detects a reference cell in the block 10B(1) during charge amounts of each of the cells 11(x-p)-11(x) are measured, the reference cell is a cell that a charge amount reached first in the charging operation (refer to FIG. 3), or a charge amount reached last in the discharging operation (refer to FIG. 7). The minimum charge amount cell detection unit 71 temporarily stores the charge amount of the reference cell.

Therefore, the charge amount difference detection unit 73 calculates the differences between the charge amount of the reference cell and charge amounts of each of the cells 11(x-p)-11(x), and obtains the charge amount differences of each of the cells 11(x-p)-11(x).

Next, it is required that the calculations to convert the information on each of the cells to discharge times, respectively, in order to adjust the charge amounts of each of the cells into that of the reference cell. However, in this embodiment, all of the information on each of the cells can not to be used as be measured, since the charge amount differences of the cells are obtained individually among the blocks in which cells 11(1) to 11(x) are grouped into blocks 10B(1) to 10B(n).

Therefore, the minimum charge amount cell comparator among blocks 72 calculates the difference between the charge amount of the reference cell in the block 10B(1) and the charge amount of the reference cell in the block 10B(n). Then minimum charge amount cell comparator among blocks 72 holds the charge amount difference between the reference cells.

To easy understanding, as shown FIG. 9, it is assumed that there are cells A1 and B1 in the block 10B(1), cells An and Bn in the block 10B(n), the reference cell is A1 in the block 10B(1), and the reference cell is An in the block 10B(n). Further, a charge amount difference between cells A1 and B1 is BV1 in the Block 10B(1), a charge amount difference between cells An and Bn is BVn in the Block 10B(n). And the charge amount of the reference cell An is less than that of the reference cell A1, and the charge amount difference between cells A1 and An is (Ref_ChDi).

The smaller charge amount cell among the all cells A1, B1, An and Bn is cell An, so this cell An is the reference cell in the all cells.

In order to obtain the charge amount of the cell Bn being the same with the charge amount of the cell An for equalization, it is need to discharge the charge amount of the cell Bn, the discharge amount corresponds to the charge amount difference BVn. On the other hand, in order to obtain the charge amount of the cell A1 in the block 10B(1) being the same with the charge amount of the cell An, it is need to discharge the charge amount of the cell A1, the discharge amount corresponds to the charge amount difference (Ref_ChDi). Further, in order to obtain the charge amount of the cell B1 in the block 10B(1) being the same with the charge amount of the cell An, it is need to discharge the charge amount of the cell B1, the discharge amount corresponds to the charge amount difference ((Ref_ChDi)+BV1). As disclosed above, it is need the charge amount difference (Ref_ChDi) between cells A1 and An, when the discharge amount of the cells in the block 10B(1) is calculated.

Therefore, the charge amount difference (Ref_ChDi) between the reference cells and the charge amount differences of the cells are transferred to the discharge time conversion unit 80. The discharge time conversion unit 80 uses the charge amount difference (Ref_ChDi) between the reference cells, when the discharge time conversion unit 80 calculates the discharge time or the control amount corresponding to the discharge time for each cell. The discharge time conversion unit 80 sends the calculated result to the switch control circuit 90.

The switch control circuit 90 makes on discharge the subjected cell to be discharged based on the control amount. The operation in this case is the same as that of the forgoing embodiment described referring to FIG. 4.

Now, when the switch control circuit 90 selects the subjected cell to be discharged, the switch control circuit 90 selects one of cells in the block 10B(1), and one of cells in the block 10B(n), then executes the discharge of a plurality of cells in same time period. But it is a premise that the discharge paths are formed in each of the blocks 10B(1) and 10B(n).

As above mentioned, the equalizing time of this embodiment is shorten, because a plurality of cells are discharged on the same period of time according to the combination of a plurality of modules, compared with a case that the apparatus is configured by one module.

On the other hand, the measuring time by the embodiment shown in FIG. 8 requires several times larger than that of the measuring time by the embodiment shown in FIG. 1, because the charge amount differences of the cells are measured individually among the blocks. Note, it is assumed that a number of cells in FIG. 1, blocks 10B(1) and 10B(n) is the same. However as disclosed in FIG. 5, the time for discharging the charge amount differences of the each cell in one of the block is long than the time for detecting the charge amounts of the each cell in one block. So, the more a number of cells is increased, the more equalizing time is influenced by a number of cells.

Therefore, as the embodiment shown in FIG. 8, if a large number of cells is equalized, it is efficiency to decrease the total time of equalizing by implementation that cells are grouped into blocks 10B(1) to 10B(n), and the simultaneous discharge of a plurality of cell is realized.

As described above, according to this embodiment, the time for equalizing the charge amount of cells can be reduced compared with sequentially discharging all of cells one by one without dividing cells into blocks, since a plurality of cells are discharged simultaneously.

As the number of cells is increased or the number of blocks is increased, the effect is increased, but the size of a circuit is also increased. Therefore, a suitable configuration is determined by design limits.

According to the invention explained herein, it is possible to effectively use the capacity of each cell constituting an assembled battery unit.

According to the invention, the accuracy of detecting a residual amount difference (a charge amount difference) between cells can be increased, and the charge rate of cells can be exactly equalized. Therefore, the capacity of each cell can be maximally used, and high-capacity design such as parallel connection of assembled batteries can be prevented. Further, when the unit according to the invention is applied to vehicles such as a motor-driven forklift and electric car (hybrid car), the number of mounted batteries is minimized, and lightweight design is possible. If the same number of batteries is mounted, a cruising distance is increased.

In the above-described unit, the voltage detection unit 40, charge amount difference detection unit 70, discharge time conversion unit 80, and switch control circuit 90 are provided in one system control section, and collectively controlled by a processor.

Control is possible by using operational information of a driver of a vehicle or signals detected from sensors provided in a vehicle. Therefore, start or stop of equalization can be controlled by charge and discharge timing.

Various settings are possible as equalizing periods, for example, vehicle parking period, momentary stop period, and self-running period in downhill. These periods may be combined or selectively set. The vehicle conditions can be judged by the signals from detectors or sensors. Further, a charge amount may be equalized by operation signals from a driver.

It is possible to provide a function of charging, discharging, or equalizing a specific cell for the purpose of maintenance or tests forced by the user. It is also possible to provide a function of sending signals to a display unit to identify the operating states of the unit, that is, whether equalization is undergoing or completed.

Figure 10:
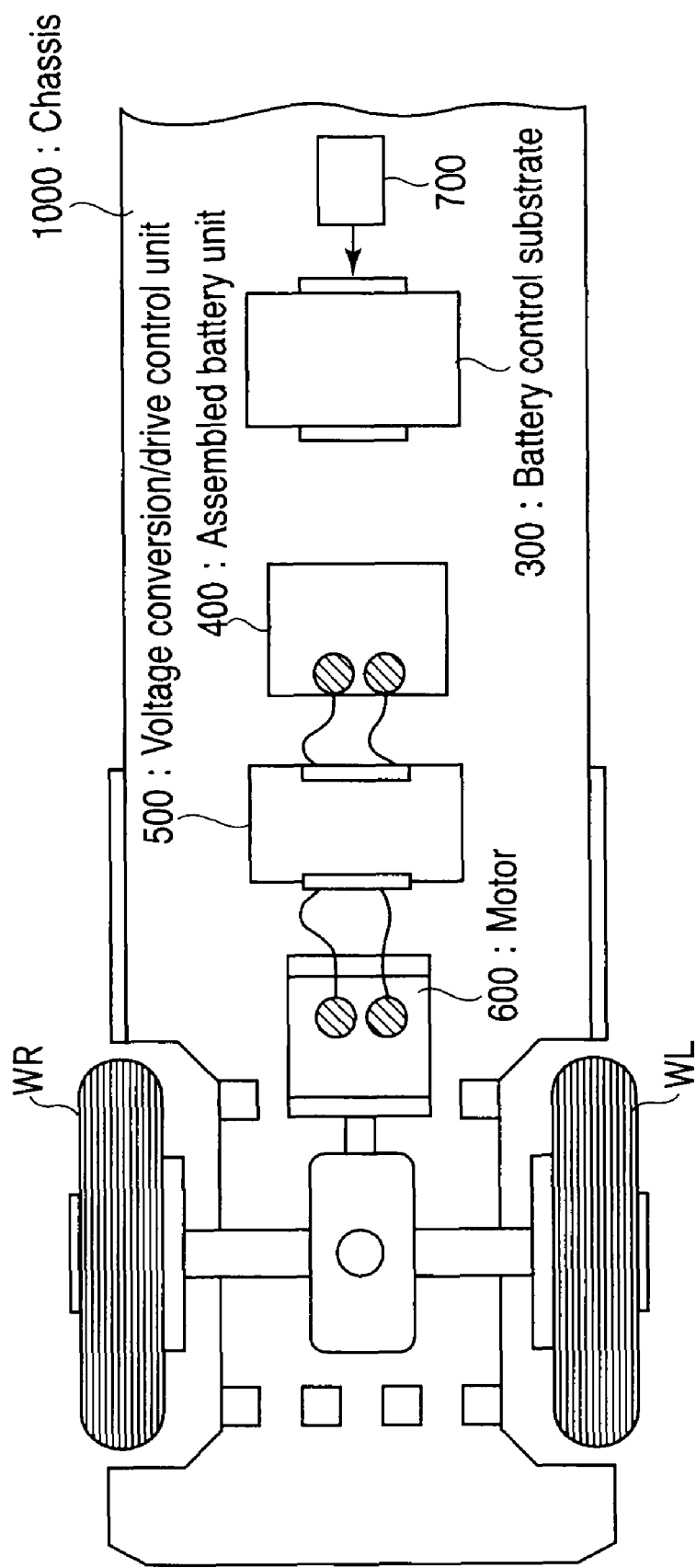
FIG. 10 is a perspective view of a vehicle equipped with the assembled battery unit of the invention.

The vehicle is shown in FIG. 10. The vehicle has a vehicle body 1000. The vehicle body 1000 supports an assembled battery unit 400 described the above-embodiment; a battery control substrate 300 to control the operation of the assembled battery unit 400; a voltage conversion/drive control unit 500 which includes an inverter, converts the voltage supplied from secondary battery cells, and controls the level and phase of output current/voltage; and a motor 600 to which the output of the voltage conversion/drive control unit 500 is supplied as a driving power. Rotation of the motor 600 is transmitted to driving wheels WR and WL through a differential gear unit, for example.

The battery control substrate 300 is powered from the assembled battery unit 400 and electrical component battery 700. The electrical component battery 700 is a lead storage battery of 12V rated voltage. A rated voltage of the assembled battery unit is about 300V obtained by 80 series-connected cells. Rotation of the motor 600 is transmitted to the driving wheels WR and WL through a transmission mechanism such as a differential gear unit.

An electric vehicle, which uses the assembled battery unit of the invention configured as described above as an energy source, can select a cell with a small voltage change, and can provide a power supply using a cell suitable for the characteristics of a vehicle. Further, the vehicle can increase a cruising distance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An assembled battery unit comprising:
   an assembled battery having a plurality of cells electrically connected in series;
   a charge amount difference detection circuit that detects charge amount differences greater than a charge amount of a reference cell having a minimum charge amount while a charging or discharge current is being applied to the cells, wherein the charge amount differences of the cells are determined by adding the charging or discharge currents during a period corresponding to time differences between the reference cell and the other cells reaching a predetermined specific voltage; and
   discharge switches controlled by a switch controller, based on the charging amount differences, to adjust the charging amounts of the cells.

2. The assembled battery unit according to claim 1, further comprising:
   a voltage detection unit configured to measure a voltage of each of the cells;
   discharge resistors respectively connected to an electrode of each of the cells;

discharge switches respectively connected to ends of every pair of the discharge resistors, and provided to electrically open and close a connection between the respective pair of the discharge resistors; and a switch controller to control the opening and closing of the discharge switches.

3. The assembled battery unit according to claim 1, wherein when any one of cells does not reach a predetermined specific voltage within a period of applying a charging or discharge current to the cells, the charge amount difference detection circuit adjusts the charging amounts of the cells, except those not reaching the predetermined specific voltage, based on the addition of the charging or discharge currents applied in a period counted from stoppage of applying the charging or discharge current to reaching the predetermined specific voltage.

4. The assembled battery unit according to claim 1, wherein when the charge amount of cells is adjusted, the cells are divided into groups consisting only of non-adjacent cells, and any one of the groups is selectively discharged at a predetermined discharge opportunity.

5. A vehicle comprising:

the assembled battery unit according to claim 1;

a driving wheel which is driven from the power supplied from the assembled battery; and a vehicle body which supports the assembled battery unit and the driving wheel.

6. The vehicle according to claim 5, wherein when any one of cells does not reach a predetermined specific voltage within a period of applying a charging or discharge current to the cells, the charge amount difference detection circuit adjusts the charging amounts of the cells, except those not reaching the predetermined specific voltage, based on the addition of the charging or discharge currents applied in a period counted from stoppage of applying the charging or discharge current to reaching the predetermined specific voltage.

7. The vehicle according to claim 5, wherein when the charge amount of cells are adjusted, the cells are divided into groups consisting only of non-adjacent cells, and any one of the groups is selectively discharged at a predetermined discharge opportunity.

* * * * *